United States Patent
Li et al.

(10) Patent No.: US 9,366,350 B2
(45) Date of Patent: Jun. 14, 2016

(54) PRESSURE REGULATOR OF GAS CYLINDER

(71) Applicants: Wen-Hung Li, Tainan (TW); Chung Wei Huang, Taichung (TW)

(72) Inventors: Wen-Hung Li, Tainan (TW); Chung Wei Huang, Taichung (TW)

(*) Notice: Subject to any disclaimer, the term of this patent is extended or adjusted under 35 U.S.C. 154(b) by 99 days.

(21) Appl. No.: 14/522,596

(22) Filed: Oct. 24, 2014

(65) Prior Publication Data

US 2015/0041001 A1 Feb. 12, 2015

(51) Int. Cl.
| F16K 31/12 | (2006.01) |
| F16K 17/168 | (2006.01) |
| F17C 13/00 | (2006.01) |
| F17C 13/04 | (2006.01) |
| F16K 1/30 | (2006.01) |
| G05D 16/10 | (2006.01) |

(52) U.S. Cl.
CPC .............. *F16K 17/168* (2013.01); *F16K 1/305* (2013.01); *F17C 13/002* (2013.01); *F17C 13/04* (2013.01); *G05D 16/103* (2013.01); *F17C 2201/0109* (2013.01); *F17C 2201/056* (2013.01); *F17C 2201/058* (2013.01); *F17C 2205/0329* (2013.01); *F17C 2205/0332* (2013.01); *F17C 2205/0338* (2013.01); *F17C 2205/0385* (2013.01); *F17C 2205/0394* (2013.01); *F17C 2223/0123* (2013.01); *F17C 2223/036* (2013.01); *Y10T 137/8326* (2015.04)

(58) Field of Classification Search
CPC ... F16K 1/305; F16K 17/168; F16K 37/0066; F16K 31/60; F17C 13/002; F17C 13/04; F17C 2205/0338; F17C 2205/0332; F17C 2205/0329; Y10T 137/8326
See application file for complete search history.

(56) References Cited

U.S. PATENT DOCUMENTS

| 4,173,986 | A | * | 11/1979 | Martin | A62B 9/02 128/205.24 |
| 4,201,244 | A | * | 5/1980 | Quirk | F16K 15/04 137/462 |
| 6,045,115 | A | * | 4/2000 | Martin, Jr. | F16K 1/305 138/44 |
| 2007/0062585 | A1 | * | 3/2007 | Gamard | F16K 1/305 137/613 |
| 2014/0318642 | A1 | * | 10/2014 | van der Klift | F16K 17/168 137/505.11 |
| 2014/0318651 | A1 | * | 10/2014 | Harris | F16K 17/366 137/625.4 |

FOREIGN PATENT DOCUMENTS

| FR | 1169228 A | * | 12/1958 | ............ F16K 17/168 |
| WO | WO 2006103533 A1 | * | 10/2006 | ............ F16K 1/305 |

* cited by examiner

*Primary Examiner* — Jessica Cahill

(57) ABSTRACT

A gas cylinder is provided with a pressure regulator including a valve body including an upper first chamber, intermediate second and third chambers, a lower channel threadedly secured to and communicating with a container body, a passageway having one end communicating with the container body, a lower through hole communicating with the intermediate third chamber and the channel, and an internally threaded top neck; a high-pressure safety valve; a low-pressure safety valve; a coupler on the valve body; a moveable member on a bottom of the intermediate third chamber; a spring biased hollow member in the intermediate second chamber and having a bottom engaged the moveable member; an externally threaded stem in the upper first chamber and complimentarily disposed on the hollow member; a hollow cap threadedly secured to the stem and the neck respectively; and a knob mounted on the stem.

1 Claim, 6 Drawing Sheets

PRESSURE REGULATOR OF GAS CYLINDER

BACKGROUND OF THE INVENTION

1. Field of the Invention

The invention relates to pressure vessels and more particularly to a pressure regulator of a gas cylinder with improved characteristics.

2. Description of Related Art

A conventional gas cylinder is shown in FIGS. 5 and 6 and includes a pressure regulator 90 mounted on a container body 80. The pressure regulator 90 includes a valve body 91 having an upper chamber 911, an intermediate chamber 912, a lower channel 913 communicating with the interior of the container body 80, and a port 914 communicating with the upper chamber 911. The upper chamber 911 communicates with the intermediate chamber 912 which communicates with the lower channel 913.

The pressure regulator 90 further includes a hollow member 92 including an enlarged head 921, the hollow member 92 provided in the intermediate 912 and having a bottom engaged a top opening the lower channel 913; a compression spring 93 put on the shank of the hollow member 92 and biased between the head 921 and the bottom of the intermediate chamber 912; a pressing member 94 placed on the top of the hollow member 92; an externally threaded stem 95 disposed on a top of the pressing member 94; an internally threaded hollow cap 96 threadedly secured to the stem 95 which has an upper portion passes through the hollow cap 96; a knob mounted on a top end of the stem 95 to cover the hollow cap 96; and a coupler 98 having one end connected to the port 914 and the other end connected to a predetermined destination. Pressurized contents in the container body 80 can flow to the predetermined destination via the lower channel 913, the intermediate chamber 912, the upper chamber 911, and the coupler 98.

Operations of the conventional pressure regulator 90 are discussed below. In an inoperative state, the top opening of the lower channel 913 is blocked by the bottom of the hollow member 92 so as to prevent any pressurized contents in the container body 80 from flowing to the destination via the pressure regulator 90. For supplying the pressurized contents in the container body 80 to the predetermined destination, a user may counterclockwise rotate the knob 97 to lift the stem 95 relative to the cap 96. As such, the hollow member 92 moves upward to expand the compression spring 93. As a result, the hollow member 92 moves upward to unblock the top of the lower channel 913, thereby permitting pressurized contents in the container body 80 to flow to the predetermined destination via the lower channel 913, the intermediate chamber 912, the upper chamber 911, and the coupler 98. The flow rate and pressure of the released pressurized contents can be adjusted by the number of rotating the knob 97. After use, the user may clockwise rotate the knob 97 to lower the stem 95 relative to the cap 96 to compress the compression spring 93 until the hollow member 92 moves downward to block the top of the lower channel 913 (i.e., blocking the flow of the pressurized contents).

However, a number of drawbacks are found in the conventional gas cylinder. For example, pressurized contents still exist in the upper chamber 911 after blocking the flow of the pressurized contents. The pressurized contents can damage the components. Further, the components are complicated, thereby increasing difficulties of assembly. Furthermore, maintenance cost can increase greatly.

Thus, the need for improvement still exists.

SUMMARY OF THE INVENTION

It is therefore one object of the invention to provide a gas cylinder comprising a container body for storing pressurized contents; and a pressure regulator comprising a valve body releasably secured to the container body, the valve body including an upper first chamber, an intermediate second chamber, an intermediate third chamber, a lower channel communicating with interior of the container body, an internal passageway having one end communicating with the interior of the container body and a second end open on a first surface of the valve body, a lower through hole being through a lower portion of the valve body and communicating with both the intermediate third chamber and the lower channel, a port on a second surface of the valve body communicating with the first chamber, and an internally threaded top neck wherein the upper first chamber communicates with the intermediate second chamber which communicates with the intermediate third chamber; and the intermediate third chamber communicates with the lower channel; a high-pressure safety valve disposed at the second end of the passageway and configured to release pressure if pressure in the container body exceeds a first predetermined pressure level; a low-pressure safety valve disposed at one end of the lower through hole and communicating with both the intermediate third chamber and the lower channel, the low-pressure safety valve being configured to release pressure if pressure leaving the lower channel exceeds a second predetermined pressure level; a coupler connected to the port; a cylinder pressure gauge mounted at a second end of the lower through hole; an outlet pressure gauge mounted on the valve body above the cylinder pressure gauge; a moveable member disposed on a bottom of the intermediate third chamber; a spring biased hollow member disposed in the intermediate second chamber and having a bottom engaged a top of the moveable member; an externally threaded stem disposed in the upper first chamber and complimentarily disposed on the spring biased hollow member, the externally threaded stem including a transverse hole and a longitudinal hole having a top end communicating with the transverse hole and a bottom end communicating with interior of the spring biased hollow member; an internally threaded hollow cap threadedly secured onto the externally threaded stem which has an upper portion passes through the internally threaded hollow cap, the internally threaded hollow cap including external threads threadedly secured to the internally threaded top neck; and a knob mounted on the externally threaded stem; wherein in an inoperative state, the moveable member blocks the lower channel; and wherein the knob is configured to rotate to lift the externally threaded stem relative to the internally threaded hollow cap so that both the spring biased hollow member moves upward and the moveable member moves upward to unblock the lower channel, thereby forming a flow path from the container body, the lower channel, the intermediate third chamber, the intermediate second chamber, and the upper first chamber to the coupler.

The above and other objects, features and advantages of the invention will become apparent from the following detailed description taken with the accompanying drawings.

DETAILED DESCRIPTION OF THE INVENTION

Figure 1:
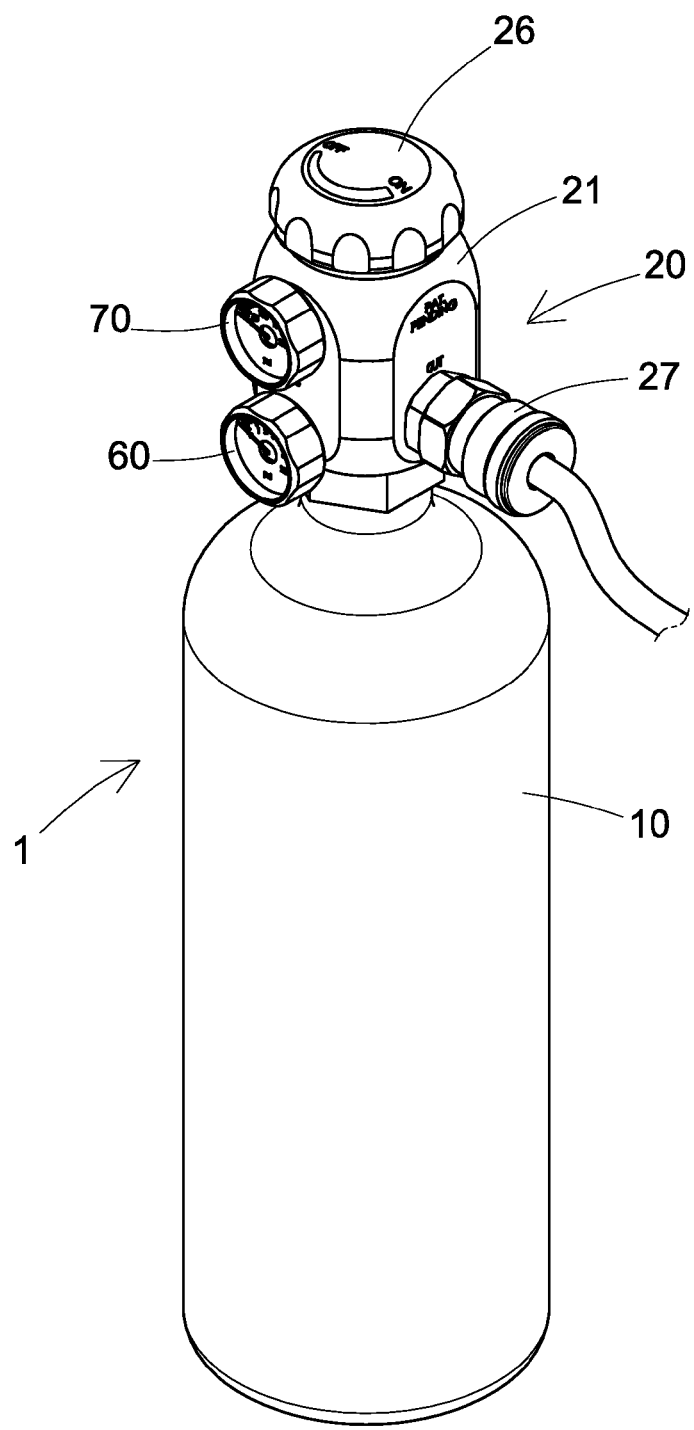
FIG. 1 is a perspective view of a gas cylinder according to the invention.
Figure 2:
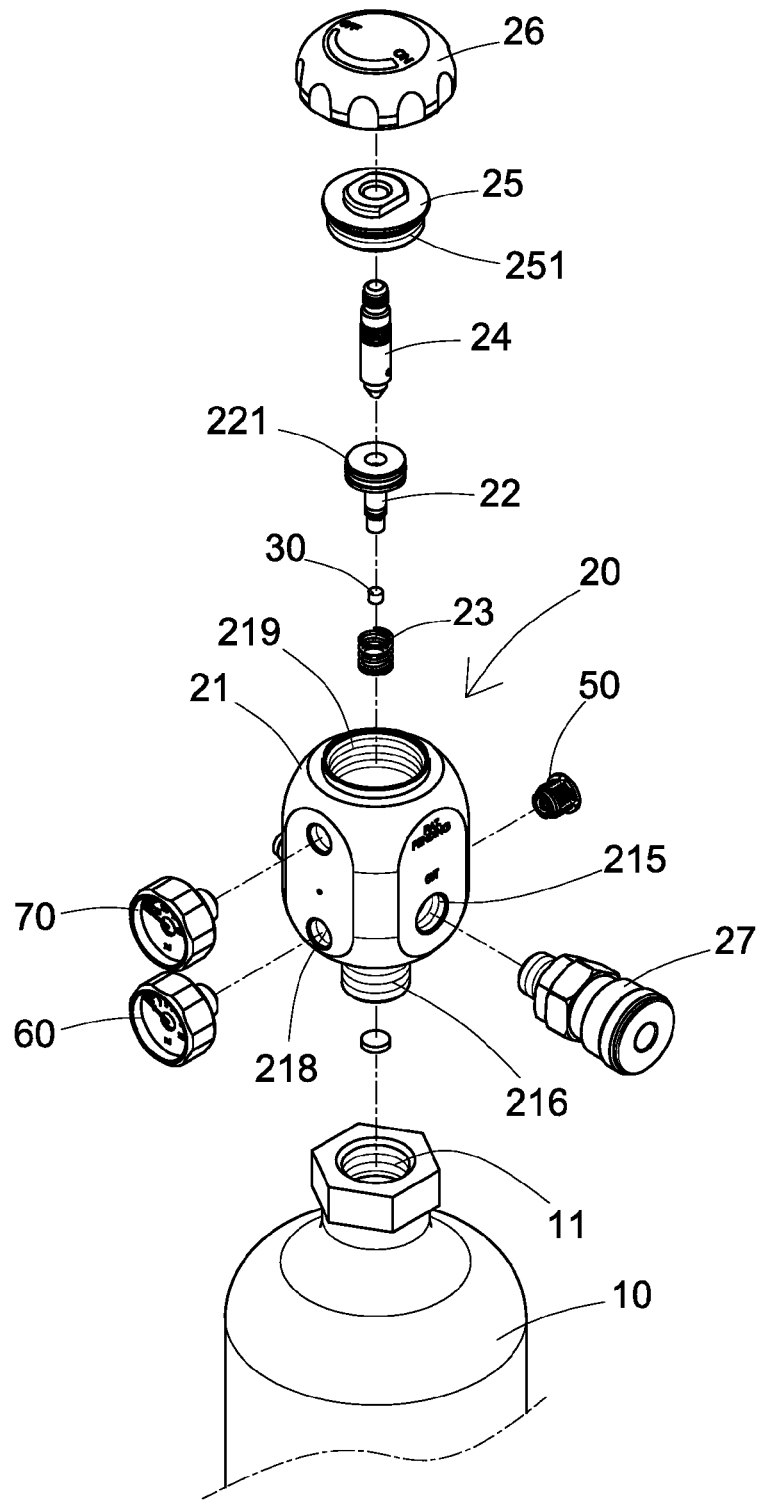
FIG. 2 is an exploded view of the pressure regulator of the gas cylinder.
Figure 3:
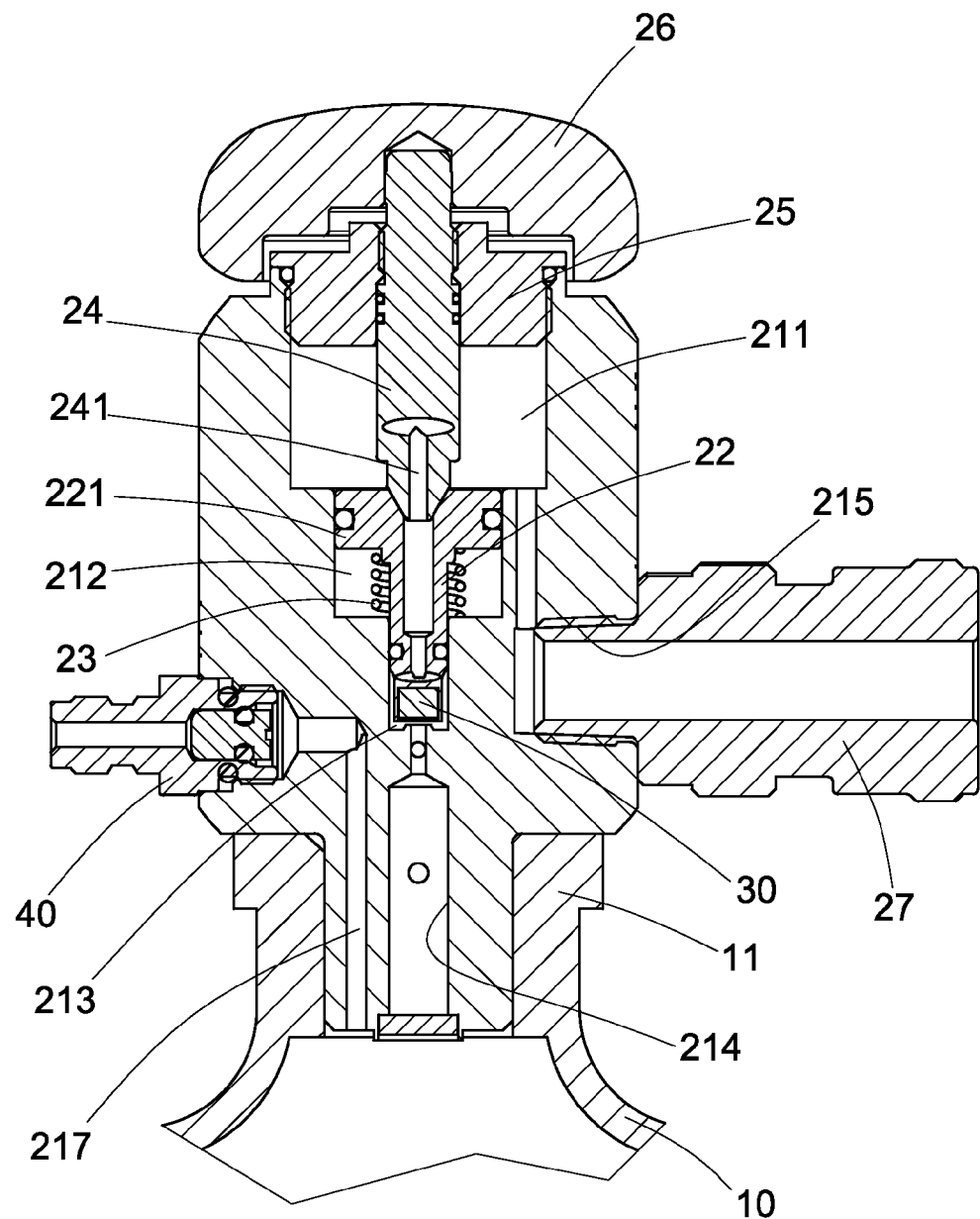
FIG. 3 is a longitudinal sectional view of the pressure regulator shown in FIG. 1.
Figure 4:
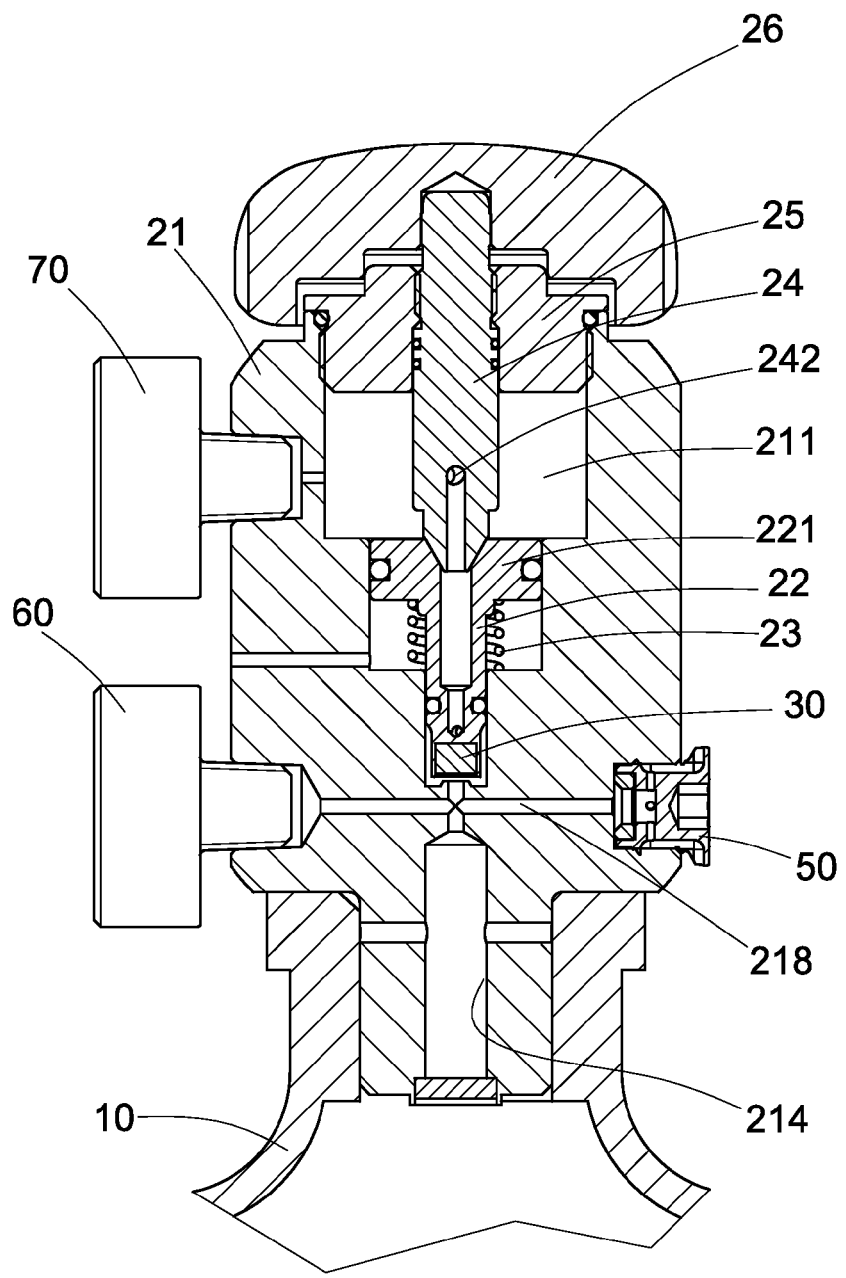
FIG. 4 is another longitudinal sectional view of the pressure regulator shown in FIG. 1.
Figure 5:
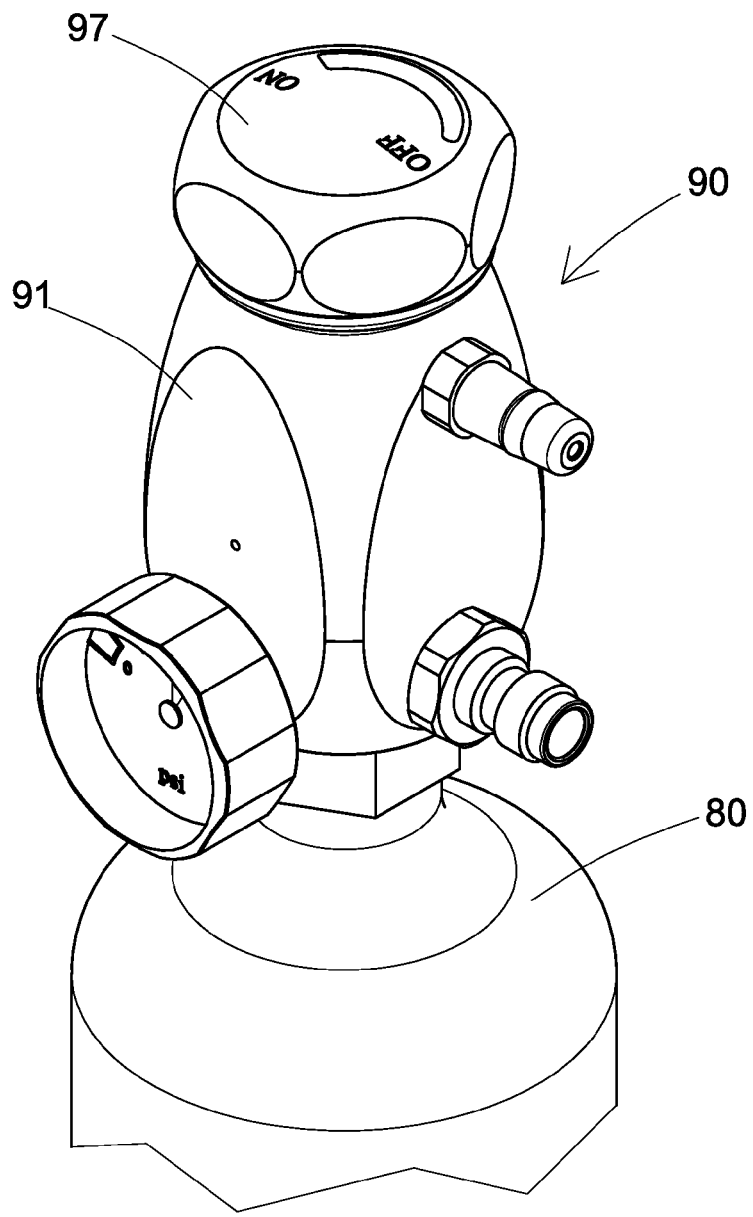
FIG. 5 is a perspective view of main portion of a conventional gas cylinder.
Figure 6:
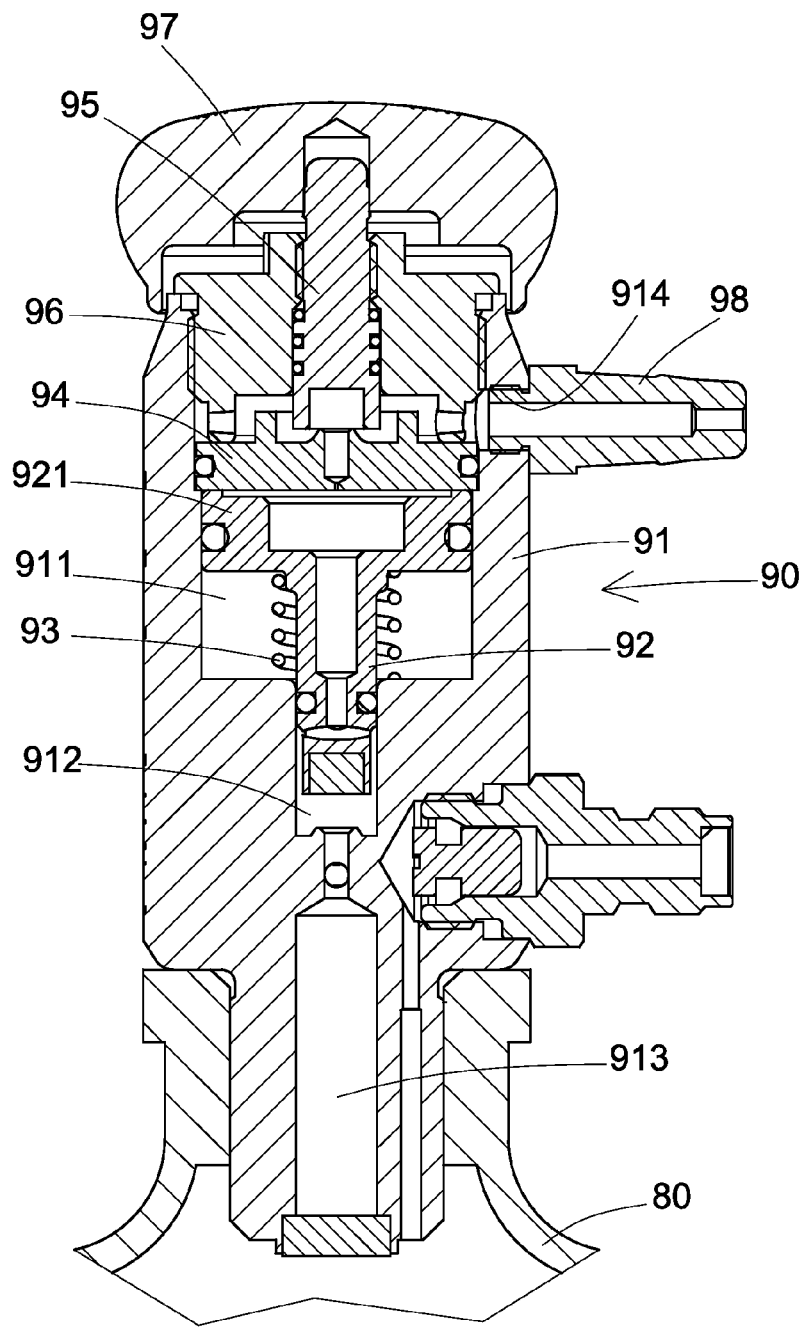
FIG. 6 is a longitudinal sectional view of the gas cylinder shown in FIG. 5.

Referring to FIGS. 1 to 4, a gas cylinder 1 in accordance with the invention comprises the following components as discussed in detail below.

Gases having pressure above atmospheric pressure (i.e., pressurized contents) are stored in a container body 10. An internally threaded opening 11 is provided on a top of the container body 10. A pressure regulator 20 comprises a valve body 21 including a hollow, externally threaded extension 216 at a bottom being threadedly fastened in the internally threaded opening 11 to secure the container body 10 and the valve body 21 (i.e., the pressure regulator 20) together, an upper first chamber 211, an intermediate second chamber 212, an intermediate third chamber 213, a lower channel 214 through the hollow, externally threaded extension 216, an internal passageway 217 having one end communicating with interior of the container body 10 and a second end open on a second surface of the valve body 21, a lower through hole 218 under the upper port 217 being through a lower portion of the valve body 21 and communicating with both the intermediate third chamber 213 and the lower channel 214, a lower port 215 on a third surface of the valve body 21 communicating with the first chamber 211, and an internally threaded neck 219 on a top.

The upper first chamber 211 communicates with the intermediate second chamber 212 which communicates with the intermediate third chamber 213. The intermediate third chamber 213 communicates with the lower channel 214. Size of the first chamber 211 is larger than that of the intermediate second chamber 212 and size of the intermediate second chamber 212 is greater than that of the intermediate third chamber 213. A high-pressure safety valve 40 is provided at the second end of the passageway 217 on the third surface of the valve body 21 and is configured to release pressure if pressure in the container body 10 exceeds a predetermined pressure level. A low-pressure safety valve 50 is provided at one end of the lower through hole 218 and communicates with both the intermediate third chamber 213 and the lower channel 214. The low-pressure safety valve 50 is configured to release pressure if pressure leaving the lower channel 214 exceeds a predetermined pressure level. A coupler 27 is connected to the lower port 215. Pressurized contents in the container body 10 can flow to a predetermined destination via the lower channel 214, the intermediate third chamber 213, the intermediate second chamber 212, the upper first chamber 211, and the coupler 27. A cylinder pressure gauge 60 is mounted at a second end of the lower through hole 218. An outlet pressure gauge 70 is mounted on one surface of the valve body 21 above the cylinder pressure gauge 60.

A moveable member 30 is disposed on a bottom of the intermediate third chamber 213. A hollow member 22 includes an enlarged head 221 is provided in the intermediate second chamber 212 and has a bottom engaged the top of the moveable member 30. A compression spring 23 is put on the hollow member 22 and is biased between the head 221 and the bottom of the intermediate second chamber 212. A stem 24 is disposed in the upper first chamber 211 and has a bottom end complimentarily disposed in a top cavity (not numbered) of the hollow member 22. The stem 24 includes a transverse hole 242 on a lower portion, and a longitudinal hole 241 having a top end communicating with an intermediate portion of the transverse hole 242 and a bottom end communicating with the interior of the hollow member 22. An internally threaded hollow cap 25 is threadedly secured to the stem 24 which has an upper portion passes through the hollow cap 25. The internally threaded hollow cap 25 includes external threads 251 threadedly secured to the internally threaded neck 219 to secure the hollow cap 25 and the valve body 21 together. A knob 26 is mounted on a top end of the stem 24 to cover the hollow cap 25.

Operations of the invention are discussed below. In an inoperative state, the moveable member 30 is tightly engaged with the top of the lower channel 214 to block any pressurized contents in the container body 10 from flowing to the intermediate third chamber 213 via the lower channel 214. For supplying the pressurized contents in the container body 10 to a predetermined destination, a user may counterclockwise rotate the knob 26 to lift the stem 24 relative to the cap 25. As such, the hollow member 22 moves upward to expand the compression spring 23. As a result, the moveable member 30 moves upward to unblock the top of the lower channel 214, thereby permitting pressurized contents in the container body 10 to flow to a predetermined destination via the lower channel 214, the intermediate third chamber 213, the intermediate second chamber 212, the upper first chamber 211, and the coupler 27. The flow rate and pressure of the released pressurized contents can be adjusted by the number of rotating the knob 26. After use, the user may clockwise rotate the knob 26 to lower the stem 24 relative to the cap 25 to compress the compression spring 23 until the moveable member 30 moves downward to block the top of the lower channel 214 (i.e., blocking the flow of the pressurized contents).

It is envisaged by the invention that pressurized contents do not exist in the intermediate second chamber 212 and the upper first chamber 211 after blocking the flow of the pressurized contents. Thus, the components can be protected. Further, assembly is made easy. Furthermore, maintenance cost can decrease greatly.

While the invention has been described in terms of preferred embodiments, those skilled in the art will recognize that the invention can be practiced with modifications within the spirit and scope of the appended claims.

What is claimed is:

1. A gas cylinder comprising:
a container body for storing pressurized contents; and
a pressure regulator comprising:
a valve body releasably secured to the container body, the valve body including an upper first chamber, an intermediate second chamber, an intermediate third chamber, a lower channel communicating with interior of the container body, an internal passageway having one end communicating with the interior of the container body and a second end open on a first surface of the valve body, a lower through hole being through a lower portion of the valve body and communicating with both the intermediate third chamber and the lower channel, a port disposed on a second surface of the valve body communicating with the first chamber, and an internally threaded top neck wherein the upper first chamber communicates with the intermediate second chamber which communicates with the intermediate third chamber; and the intermediate third chamber communicates with the lower channel;

a first safety valve disposed at the second end of the passageway and configured to release pressure if pressure in the container body exceeds a first predetermined pressure level;

a second safety valve disposed at one end of the lower through hole and communicating with both the intermediate third chamber and the lower channel, the second safety valve being configured to release pressure if pressure leaving the lower channel exceeds a second predetermined pressure level;

a coupler connected to the port;

a cylinder pressure gauge mounted at a second end of the lower through hole;

an outlet pressure gauge mounted on the valve body above the cylinder pressure gauge;

a moveable member disposed on a bottom of the intermediate third chamber;

a spring biased hollow member disposed in the intermediate second chamber and having a bottom engaging a top of the moveable member;

an externally threaded stem disposed in the upper first chamber and disposed on the spring biased hollow member, the externally threaded stem including a transverse hole and a longitudinal hole having a top end communicating with the transverse hole and a bottom end communicating with interior of the spring biased hollow member;

an internally threaded hollow cap threadedly secured onto the externally threaded stem which has an upper portion passing through the internally threaded hollow cap, the internally threaded hollow cap including external threads threadedly secured to the internally threaded top neck; and a knob mounted on the externally threaded stem;

wherein in an inoperative state, the moveable member blocks the lower channel; and wherein the knob is configured to rotate to lift the externally threaded stem relative to the internally threaded hollow cap so that both the spring biased hollow member moves upward and the moveable member moves upward to unblock the lower channel, thereby forming a flow path from the container body, the lower channel, the intermediate third chamber, the intermediate second chamber, and the upper first chamber to the coupler.

\* \* \* \* \*